(12) United States Patent
Druzynski et al.

(10) Patent No.: US 6,478,426 B1
(45) Date of Patent: Nov. 12, 2002

(54) RECTILINEAR FILM TRANSPORT SYSTEM

(75) Inventors: Richard L. Druzynski, East Rochester, NY (US); Martin E. Oehlbeck, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 91 days.

(21) Appl. No.: 09/666,850

(22) Filed: Sep. 21, 2000

(51) Int. Cl.$^7$ ................................................. G03B 1/00
(52) U.S. Cl. ..................... 352/166; 352/185; 352/191; 348/97
(58) Field of Search .......................... 352/166, 186, 352/187–191; 348/96, 97

(56) References Cited

U.S. PATENT DOCUMENTS

| | | | |
|---|---|---|---|
| 1,372,733 A | | 3/1921 | Workman et al. |
| 2,382,772 A | | 8/1945 | Canady ..................... 88/18.4 |
| 3,049,275 A | * | 8/1962 | Nuttall ........................ 226/63 |
| 3,249,274 A | | 5/1966 | Borberg ....................... 226/63 |
| 3,776,626 A | * | 12/1973 | Lewis ........................ 352/194 |
| 5,430,477 A | * | 7/1995 | Bachmann et al. ........... 348/97 |
| 6,002,470 A | | 12/1999 | Jarvis et al. ................. 355/97 |
| 6,037,973 A | * | 3/2000 | DiGiulio ...................... 348/96 |
| 6,081,293 A | | 6/2000 | Brown et al. ................. 348/97 |

* cited by examiner

Primary Examiner—Russell Adams
Assistant Examiner—Michelle Nguyen
(74) Attorney, Agent, or Firm—David M. Woods

(57) ABSTRACT

A pin-registered film transport assembly provides an interlacing motion for moving and guiding a photographic film through a film gate. The assembly includes a first carriage mounted for movement parallel to a direction of film travel and a first pin assembly including a first pair of registration pins which are engageable in oppositely disposed perforations of the film, where the first pin assembly is mounted on the first carriage for movement perpendicular to the direction of film travel for engaging and disengaging the film perforations. The assembly also includes a second carriage mounted for movement parallel to the direction of film travel and a second pin assembly including a second pair of registration pins which are engageable in oppositely disposed perforations of the film, where the second pin assembly is mounted on the second carriage for movement perpendicular to the direction of film travel. The carriages and pin assemblies are moved and controlled such that the first pair of registration pins engages the film perforations at a starting position and moves the film in the direction of film travel while the second pair of registration pins is repositioning to the starting position for engagement with another pair of perforations. This action is then repeated to provide improved movement of the film through the film gate, particularly by reducing the time latency during pin retrace motion.

8 Claims, 6 Drawing Sheets

RECTILINEAR FILM TRANSPORT SYSTEM

FIELD OF THE INVENTION

The invention relates generally to apparatus for moving and guiding a photographic film with sprocket holes through the film gate of a scanner.

BACKGROUND OF THE INVENTION

Film transport systems are known in the prior art for supporting and transporting a single film frame in a precisely controlled linear motion past a scanning aperture, e.g., of a telecine. A pin assembly carrying precision milled registration pins on a film transport carriage engages with the film sprocket holes in a path perpendicular to the film plane. After the registration pins are engaged with the sprocket holes, a precision motor pulls the single frame across the scanning aperture. When the single frame has passed by the aperture, the motor stops and the registration pins are removed from engagement with the sprocket holes in the film. The motor then returns the carriage to an initial position to engage the sprocket holes of a subsequent frame of film. (See, e.g., U.S. Pat. No. 6,081,293, entitled "Linear Motion Film Gate for a Telecine"

FIG. 1A shows the traditional location of the registration pins in a prior art film transport assembly of the type described above. A full fitting pin 10 and a partial fitting pin 12 provide a reference location for film perforations 14 in a film frame 16 relative to a scanning location 18, and a retrace pin 20 secures the film in place while the pins 10 and 12 are disengaged and returned to their initial position to engage a subsequent frame of film. In this configuration, the pins 10 and 12 provide linear motion of the film frame 14 while the retrace pin 20 is operative in one position only to hold the frame 14 stationary until the next movement. Typically, since the retrace pin 20 is not intended to register the film, the retrace pin 20 is located at a perforation pitch that will insure that the contacted perforation edge will not be used during image registration.

FIG. 1B illustrates a typical rectilinear motion as traced by the registration pins 10 and 12 of the prior art film transport assembly. In an advance motion 22, the registration pins move the film frame through the scanning or recording area. In a pin retract motion 24, the registration pins are withdrawn from the film perforations and in a retrace motion 26 the registration pins travel back to their initial position (while not in contact with the film). Finally, in a pin insert motion 28 the registration pins engage the film perforations of the next film frame, and the sequence is repeated.

A common problem with any film transport system of this type is that the retrace motion defines a latent period during which the film is not moved. In addition, there is time involved in the acceleration and deceleration of the pin assembly. Since the film frame has already been scanned during the advance motion, this is essentially lost or wasted time. It would be beneficial to utilize this time period for film movement, and thereby to reduce time latency in rectilinear film transport systems.

SUMMARY OF THE INVENTION

The present invention is directed to overcoming one or more of the problems set forth above. Briefly summarized, according to one aspect of the present invention, a pin-registered device for moving and guiding a photographic film through a film gate includes four independently controllable linear members that provide two non-interfering rectilinear paths for two pairs of registration pins. More specifically, one rectilinear path is provided by a first carriage mounted for reciprocal movement parallel to a direction of film travel and a first pin assembly including a first pair of oppositely disposed pins which are engageable in oppositely disposed perforations of the film, where the first pin assembly is mounted on the first carriage for movement perpendicular to the direction of film travel for engaging and disengaging the film perforations. The second rectilinear path is provided by a second carriage mounted for reciprocal movement parallel to the direction of film travel and a second pin assembly including a second pair of oppositely disposed pins which are engageable in oppositely disposed perforations of the film, where the second pin assembly is mounted on the second carriage for movement perpendicular to the direction of film travel for engaging and disengaging the film perforations. The carriages and pin assemblies are moved and controlled such that the first pair of pins engages the perforations in the film at a start position and moves the film in the direction of film travel while the second pair of pins is repositioning to the start position for engagement with another pair of perforations. This action is then repeated to provide movement of consecutive film frames through the film gate.

The advantage of the invention is that it allows for higher pin registered film transport speeds without compromising image position stability.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1A:
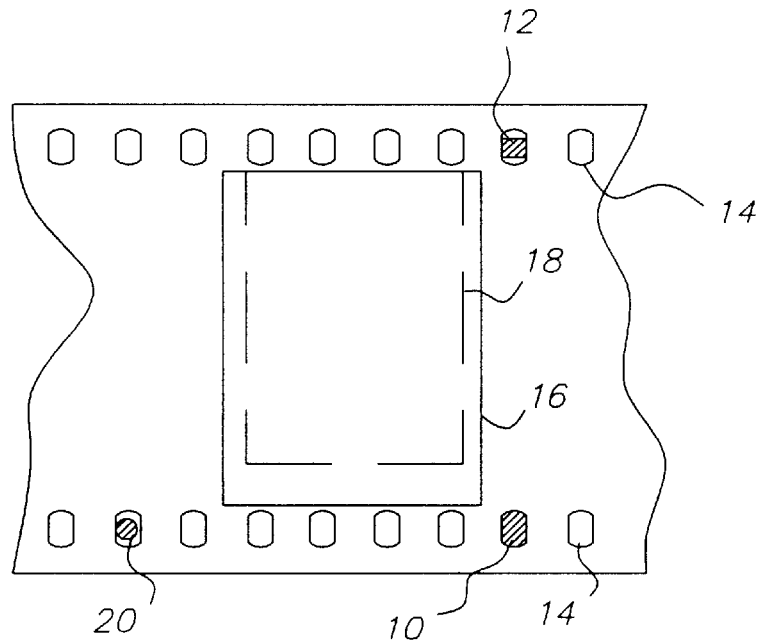
FIG. 1A is a diagram of a section of film showing a pin registration technique known in the prior art.

Because film transport systems employing pin registration are well known, the present description will be directed in particular to elements forming part of, or cooperating more directly with, apparatus in accordance with the present invention. Elements not specifically shown or described herein may be selected from those known in the art. For example, details of the film transport path, including feed and takeup spools, sprocket rollers, drive capstans, etc., are not disclosed herein inasmuch as such elements do not form part of the invention, and they may be selected from such disclosures as U.S. Pat. No. 5,430,477, entitled "Device for Moving and Guiding a Motion-Picture Film in a Telecine Scanner", which is incorporated herein by reference. Likewise, the film transport assembly of this invention may be used with a scanner station, such as shown in the '477 patent, or it may be used in a film recording station, where a laser or like recording device is used to write information signals on the film. The invention may also be used in connection with optical illumination or exposure of the film in the pin-registered position.

Referring in combination to FIGS. 2 through 5, a pin registered film transport assembly 30 moves and guides a motion picture film 32 with perforations 34 through a film gate 36 where a frame 40 of the film is scanned or written along a writing or scanning line 38. In brief, the film transport assembly 30 uses two pairs of registration pins positioned to follow two non-interfering rectilinear paths. As one of the pairs is moving the film along the scan or record path, the second pair of pins is re-tracing to the original position. The second pair then advances to engage the perforations and again move the film along the path. These linear motions are provided by two sets of independently moving and controlled devices. For one set of motions, the film transport assembly 30 includes a first transport carriage 42 and a second transport carriage 44 both mounted in a track 46 for reciprocating movement parallel to a direction 48 of film travel. The track 46 is formed in a stationary transport guide 50. As will be described in more detail, the second set of linear movements is provided by pin assemblies that are mounted on the respective transport carriages.

Figure 2:
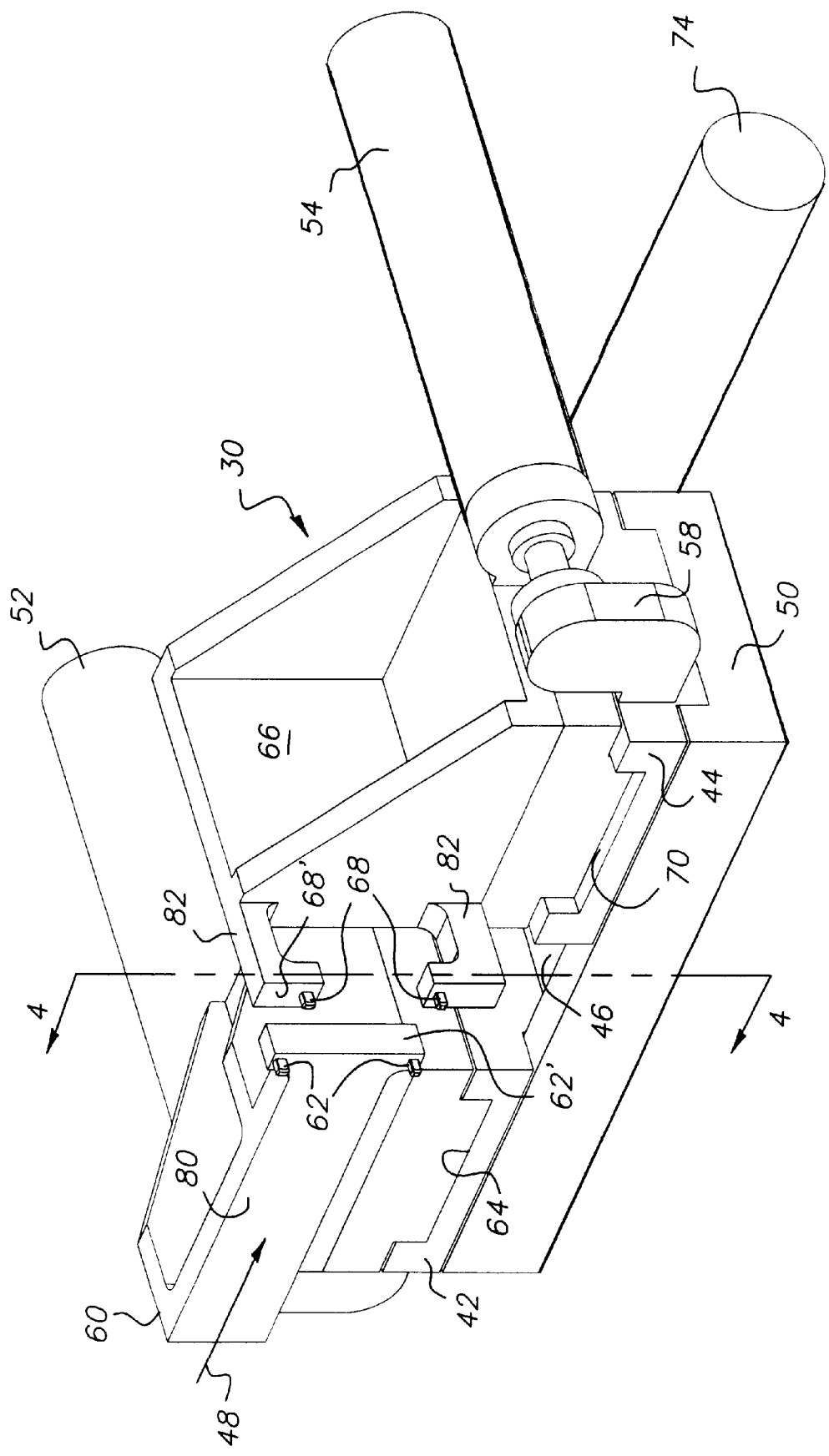
FIG. 2 is an isometric view of a rectilinear film transport assembly in accordance with the invention.
Figure 3:
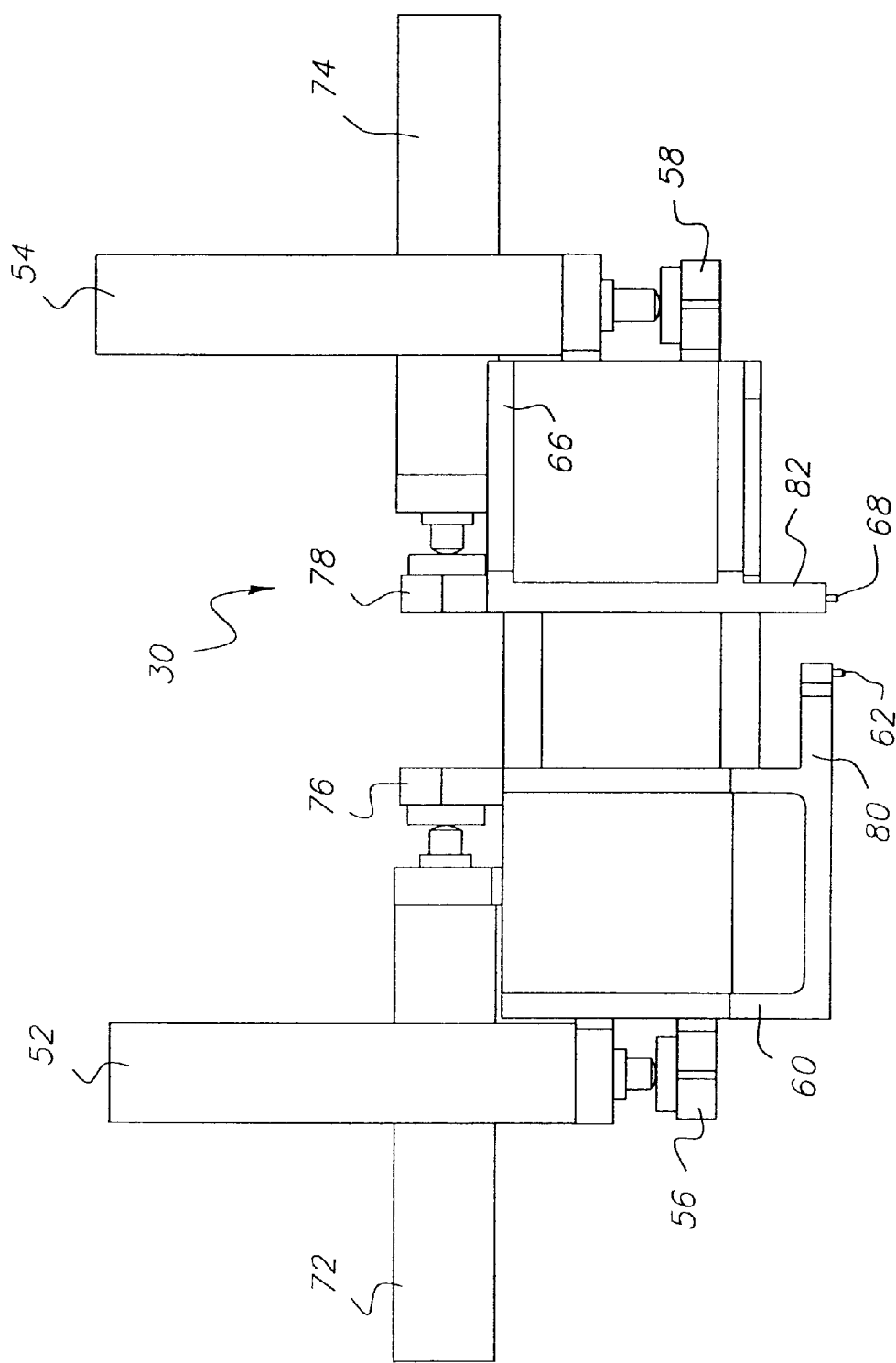
FIG. 3 is a top view of the assembly shown in FIG. 2.

The reciprocating motions of the carriages 42 and 44 are provided by respective carriage actuators 52 and 54, which may be any type of driving element that provide precision, repeatable motion in both forward and reverse directions (relative to the direction 48 of film travel). For instance, a conventional piezoelectric actuator may be used, which is an electromechanical device that undergoes a dimensional change when a voltage is applied to it. As shown in FIGS. 2 and 3, the dimensional change is transformed into linear motion through the respective couplers 56 and 58, which are coupled to the carriages 42 and 44 to provide reciprocal motion of the carriages in the track 46. A typical piezoelectric actuator is available from Burleigh Instruments, Inc., Fishers, N.Y. under the name of Inchworm™. Instead of a piezoelectric actuator, a conventional linear motor stage may also be used, which is a direct drive device that provides high speed and acceleration in combination with precise, small resolution steps. A typical linear motor is the ALS130 motor, available from Aerotech, Inc., Pittsburgh, Pa. Notwithstanding the preferred actuator or motor, the claims are intended to cover any type of driving element that can accomplish the requisite motions.

Figure 5:
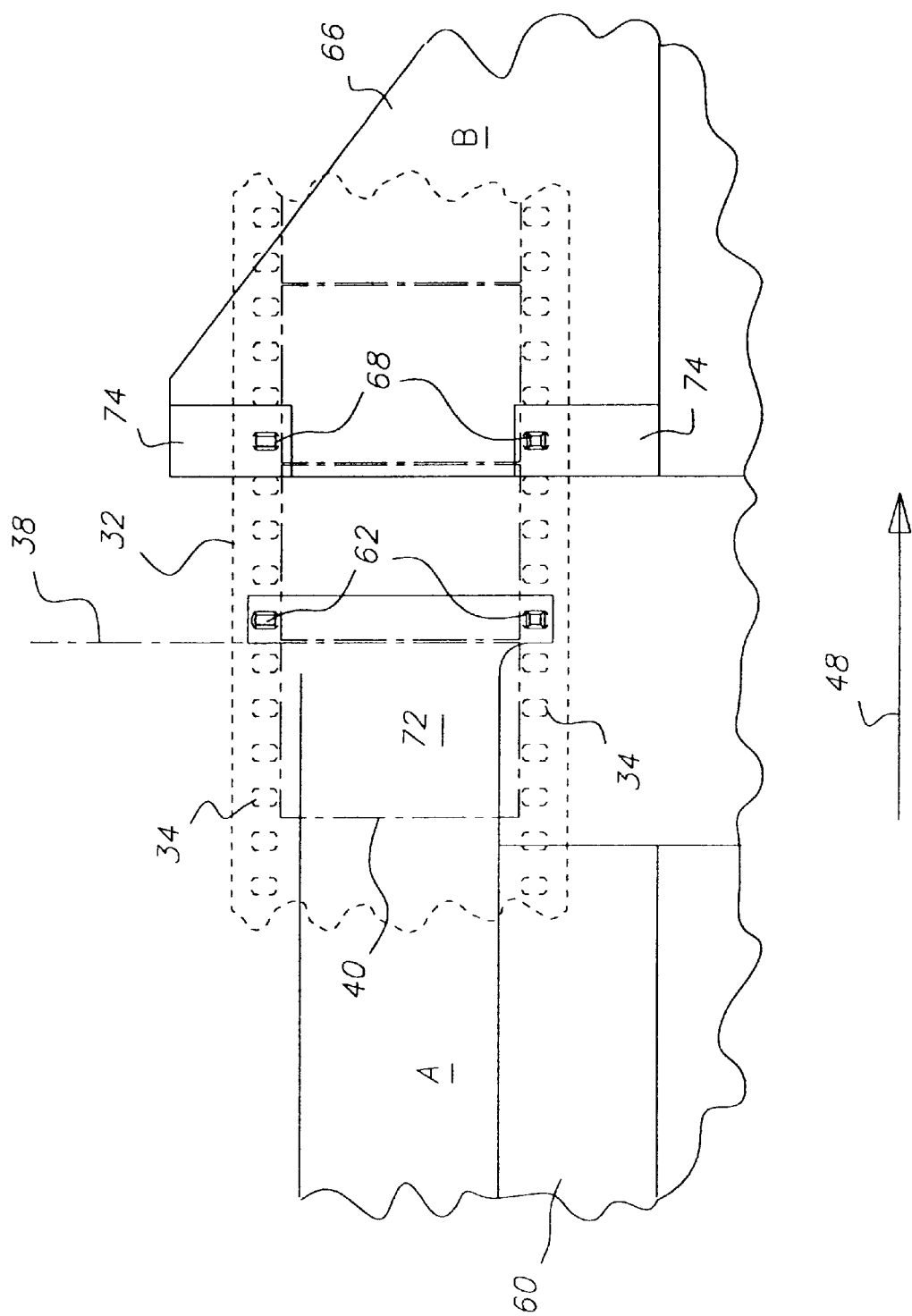
FIG. 5 is a diagram of a section of film showing engagement of the registration pins shown in FIG. 2.

The film transport assembly 30 further includes a pair of pin assemblies providing the aforementioned second set of linear movements, which together with the first set of movements convey the two pairs of registration pins through non-interfering rectilinear paths, thereby performing pin registration with reduced latency time. A first pin assembly 60 including a first pair of oppositely disposed registration pins 62 is mounted in a track 64 on the first transport carriage 42 for movement perpendicular to the direction 48 of film travel. As shown in FIG. 5, the registration pins 62 are positioned to selectively engage and disengage with oppositely disposed perforations 34 of the film 32. A second pin assembly 66 including a second pair of oppositely disposed registration pins 68 is mounted in a track 70 on the second transport carriage 44 for movement perpendicular to the direction 48 of film travel. As shown in FIG. 5, the registration pins 68 are also positioned to selectively engage and disengage with oppositely disposed perforations 34 of the film 32. The reciprocating motions of the assemblies 60 and 66 are provided by respective pin assembly actuators 72 and 74, which may be any type of driving element that provide precision, repeatable motion perpendicular to the direction 48 of film travel. These actuators may be the same as the driving elements described above, such as piezoelectric actuators or linear motors. As shown in FIGS. 2 and 3, the preferred actuators are piezoelectric actuators 72 and 74, and their dimensional changes are transformed into linear motion through the respective couplers 76 and 78, which are coupled to the assemblies 60 and 66 to provide reciprocal motion of the assemblies in the respective tracks 64 and 70.

The registration pins 62 and 68 are mounted on their respective assemblies 60 and 66 so as to provide an interlacing movement in which each pair of pins can pass behind the other pair, depending on the movements of the carriages 42 and 44 and pin assemblies 60 and 66. In the preferred embodiment, the registration pins 62 are mounted on pin supports 62' outwardly extending from a member 80, and the registration pins 68 are mounted on pin supports 68' inwardly extending from separate arms 82. The arms 82 are sufficiently separated as to permit rectilinear movement of the outwardly extending pin supports 62' on the member 80 parallel to film travel, and the member 80 is dimensioned so as to permit rectilinear movement of the inwardly extending pin supports 68' on the arms 82 perpendicular to film travel. As a consequence, the pairs of registration pins 62 and 68 are able to follow separate non-interfering paths, with each path tracing the rectilinear movement shown in FIG. 1B.

Figures 4A, 4B:
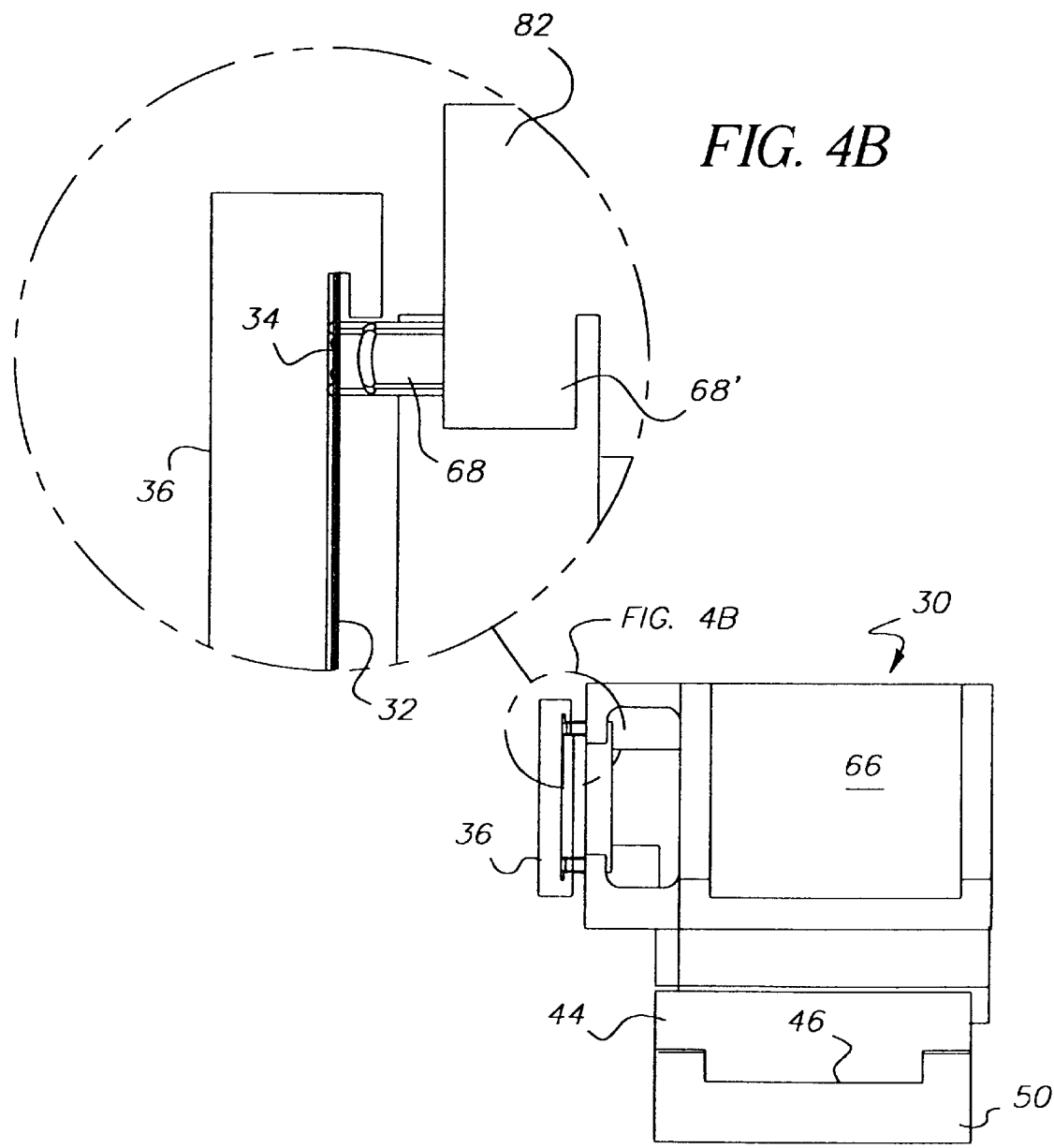
FIG. 4 is a cross section of the film transport assembly taken along a line 4—4 in FIG. 2, further showing a film guidance track for guiding the film through a film gate area where the film is scanned or written upon.

FIGS. 6A to 6F are a series of isometric views of several positions of the film transport assembly 30 shown in FIGS. 2 through 5, illustrating the several stages of rectilinear motion involved in transport of the film 32. In order to facilitate description and illustration, the pin assembly 60 will be described (and shown in FIGS. 6A to 6F) as "body A" and pin assembly 66 will be described as "body B". (The film and the film gate are not shown in these illustrations; it should be understood that they line up with the carriage assembly as shown in FIGS. 4 and 5.)

Figure 6A:
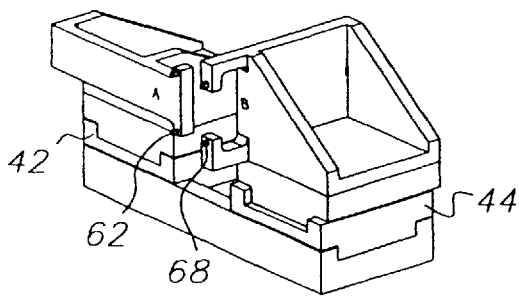
FIGS. 6A to 6F are a series of isometric views of several positions of the assembly shown in FIG. 2, illustrating the several stages of rectilinear motion involved in transport of the film.

FIG. 6A shows the carriages 42 and 44 and the registration pins 62 and 68 at the point of exchange. The registration pins 62 in body A are at a travel starting position and are ready to be inserted (pre-insertion point) into the film perforations. The registration pins 68 in body B are currently inserted into the perforations at a travel ending position, and ready to be retracted.

Figure 6B:
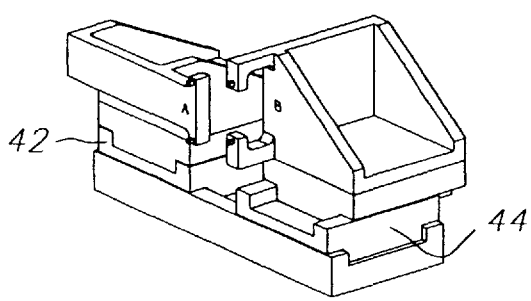

FIG. 6B shows body B going through the pin retract motion 24 (FIG. 1B) on the carriage 44, thereby retracting registration pins 68 from the perforations. Body A registration pins 62 are shown inserted in the film perforations. In side elevation, this view is similar to that shown in FIG. 5, which shows the engagement of the registration pins 62 in the "A" body, ready to advance the film for recording.

Figure 6C:
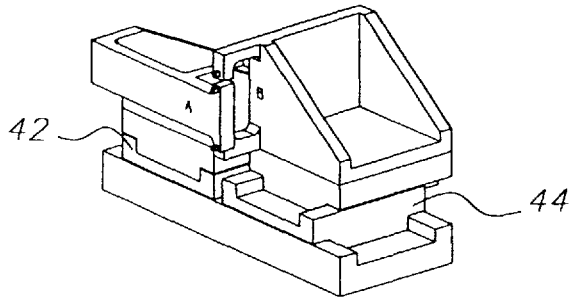

FIG. 6C shows the carriage 42 and the body A advancing the film (i.e., the advance motion 22 shown in FIG. 1B) into the scanning or recording aperture while body B is retracing on the carriage 44 to the beginning position (the retrace motion 26).

Figure 6D:
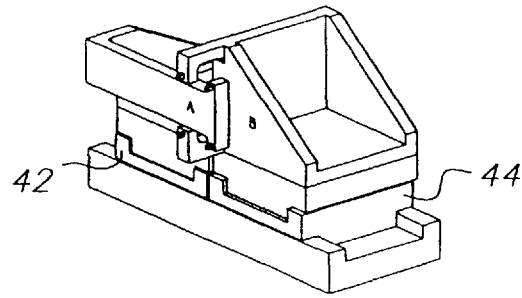

FIG. 6D shows carriage 44 and body B completing their motion to the pre-insert position while interlacing with body A, which is in the process of reaching the travel ending position.

Figure 6E:
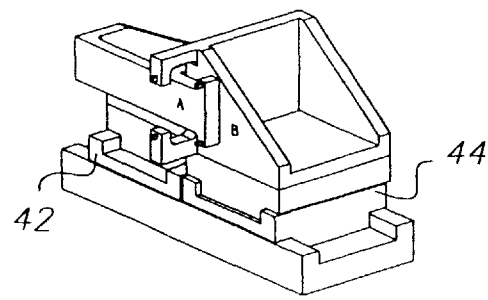

FIG. 6E shows body A retracting on carriage 42 from the film perforations (the pin retract motion 24) while body B is inserting its registration pins 68 into the next pair of perforations at the travel starting position (the pin insert motion 28).

Figure 6F:
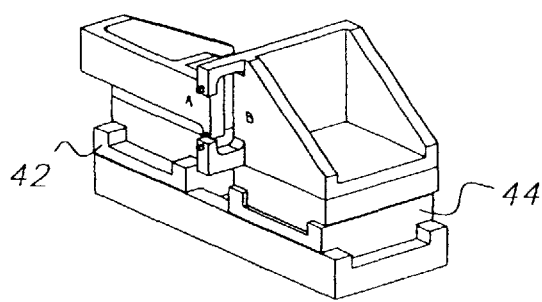

FIG. 6F shows carriage 44 and body B beginning their travel toward the travel ending position (the advance motion 22) while carriage 42 and body A are retracing their movement (the retracing movement 26).

Figure 1B:
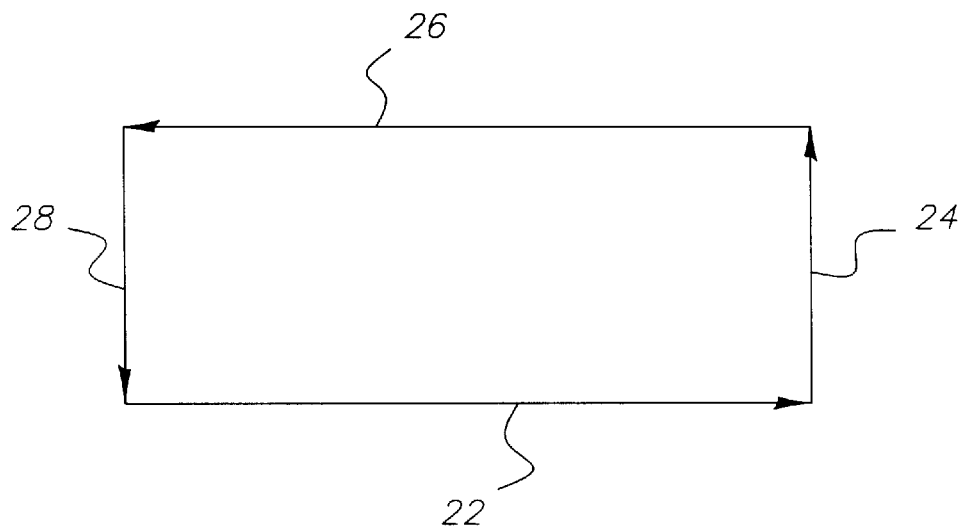
FIG. 1B is a diagram showing rectilinear motion of registration pins as understood in the prior art.

In order to reduce time latency in rectilinear motion film transport systems, the invention is based on the principle of having two sets of registration pins in motion simultaneously. More specifically, the method and apparatus described herein is comprised of four individually controllable linear sliding members with encoders. Referring to FIG. 1B, two of the sliders, i.e., the carriages 42 and 44, are arranged to each provide motion 22 and 26 in the advance and retrace directions, and to each of them an additional slider, i.e., the pin assemblies 60 and 66, is mounted perpendicular to the first. The additional sliders are arranged to each provide motion 24 and 28 in the retract and insert directions. This arrangement is typically referred as an "X-Y" slider. It will be preferable to utilize encoder positional and velocity feedback from each of the sliders to insure drive speed accuracy and to establish the position of the registration pins prior to scanning or writing.

The invention has been described with reference to a preferred embodiment. However, it will be appreciated that variations and modifications can be effected by a person of ordinary skill in the art without departing from the scope of the invention.

Parts List 10 full fitting pin
12 partial fitting pin
14 film perforations
16 film frame
18 scanning location
20 retrace pin
22 advance motion
24 pin retract motion
26 retrace motion
28 pin insert motion
30 film transport assembly
32 motion picture film
34 perforations
36 film gate
38 writing or scanning line
40 frame
42 first transport carriage
44 second transport carriage
46 track
48 direction of film travel
50 stationary transport guide
52 carriage actuator
54 carriage actuator
56 coupler
58 coupler
60 first pin assembly
60' pin supports
62 registration pins
64 track
66 second pin assembly
68 registration pins
68' pin supports
70 track
72 pin assembly actuator
74 pin assembly actuator
76 coupler
78 coupler
80 member
82 arms

What is claimed is:

1. A pin-registered device for moving and guiding a photographic film with perforations through a film gate, said device comprising:

a stationary transport guide having a transport track;

a first carriage mounted on a first portion of the transport track for reciprocal motion parallel to a direction of film travel;

a first pin assembly including a first pair of oppositely disposed registration pins which are engageable in oppositely disposed perforations of the film, said first pin assembly mounted on a carriage track on the first carriage for reciprocal motion along the carriage track on the first carriage perpendicular to the direction of the transport track and to the direction of film travel for selective engagement and disengagement with the pair of oppositely disposed perforations of the film;

a second carriage mounted on a second portion of the transport track for reciprocal motion parallel to the direction of film travel;

a second pin assembly including a second pair of oppositely disposed registration pins which are engageable in oppositely disposed perforations of the film, said second pin assembly mounted on a carriage track on the second carriage for reciprocal motion along the carriage track on the second carriage perpendicular to the direction of the transport track and to the direction of film travel for selective engagement and disengagement with the pair of oppositely disposed perforations of the film; and means for moving and controlling the carriages and pin assemblies such that the first pair of pins engages the perforations in the film at a starting position and moves the film in the direction of film travel while the second pair of pins is repositioning to the starting position for engagement with another pair of perforations.

2. The device as claimed in claim 1 wherein said means for moving and controlling the carriages and pin assemblies comprises:

first drive means for reciprocating the first carriage in a rectilinear motion parallel to the direction of film travel;

a first linear actuator for actuating the first pin assembly to move the first pair of pins into engagement with oppositely disposed perforations of the film;

second drive means for reciprocating the second carriage in a rectilinear motion parallel to the direction of film travel; and a second linear actuator for actuating the second pin assembly to move the second pair of pins into engagement with oppositely disposed perforations of the film.

3. The device as claimed in claim 2 wherein the first and second linear actuators comprise first and second piezoelectric actuators for transporting the pin assemblies perpendicular to the film.

4. The device as claimed in claim 2 wherein the first and second linear actuators comprise first and second linear motors for transporting the pin assemblies perpendicular to the film.

5. The device as claimed in claim 2 wherein the first and second drive means comprise first and second piezoelectric actuators for transporting the carriages in rectilinear motions relative to the film.

6. The device as claimed in claim 2 wherein the first and second drive means comprise first and second linear motors for transporting the carriages in rectilinear motions relative to the film.

7. The device as claimed in claim 1 wherein the first and second registration pins are mounted on respective pin support members that are configured relative to each other so as to permit each pair of registration pins to follow non-interfering rectilinear paths between the starting position and an ending position.

8. A pin-registered device for moving and guiding a photographic film with perforations through a film gate, said device comprising:

a first carriage mounted for reciprocal motion parallel to a direction of film travel;

a first pin assembly including a first pair of oppositely disposed registration pins which are engageable in oppositely disposed perforations of the film, said first pin assembly mounted on the first carriage for reciprocal motion perpendicular to the direction of film travel for selective engagement and disengagement with the pair of oppositely disposed perforations of the film;

a second carriage mounted for reciprocal motion parallel to the direction of film travel;

a second pin assembly including a second pair of oppositely disposed registration pins which are engageable in oppositely disposed perforations of the film, said second pin assembly mounted on the second carriage for reciprocal motion perpendicular to the direction of film travel for selective engagement and disengagement with the pair of oppositely disposed perforations of the film;

wherein the first and second pairs of registration pins are mounted on respective first and second pin support members, supported from their respective carriages, which are configured relative to each other so as to permit each pair of registration pins to follow non-interfering rectilinear paths between a starting position and an ending position, the first of said pin support members being dimensioned so as to permit rectilinear movement of the second pin support member parallel to film travel, and the second of said pin support members being dimensioned so as to permit rectilinear movement of the first pin support member perpendicular to film travel; and means for moving and controlling the carriages and pin assemblies such that the first pair of pins engages the perforations in the film at the starting position and moves the film in the direction of film travel while the second pair of pins is repositioning to the starting position for engagement with another pair of perforations.

* * * * *